UNITED STATES PATENT OFFICE.

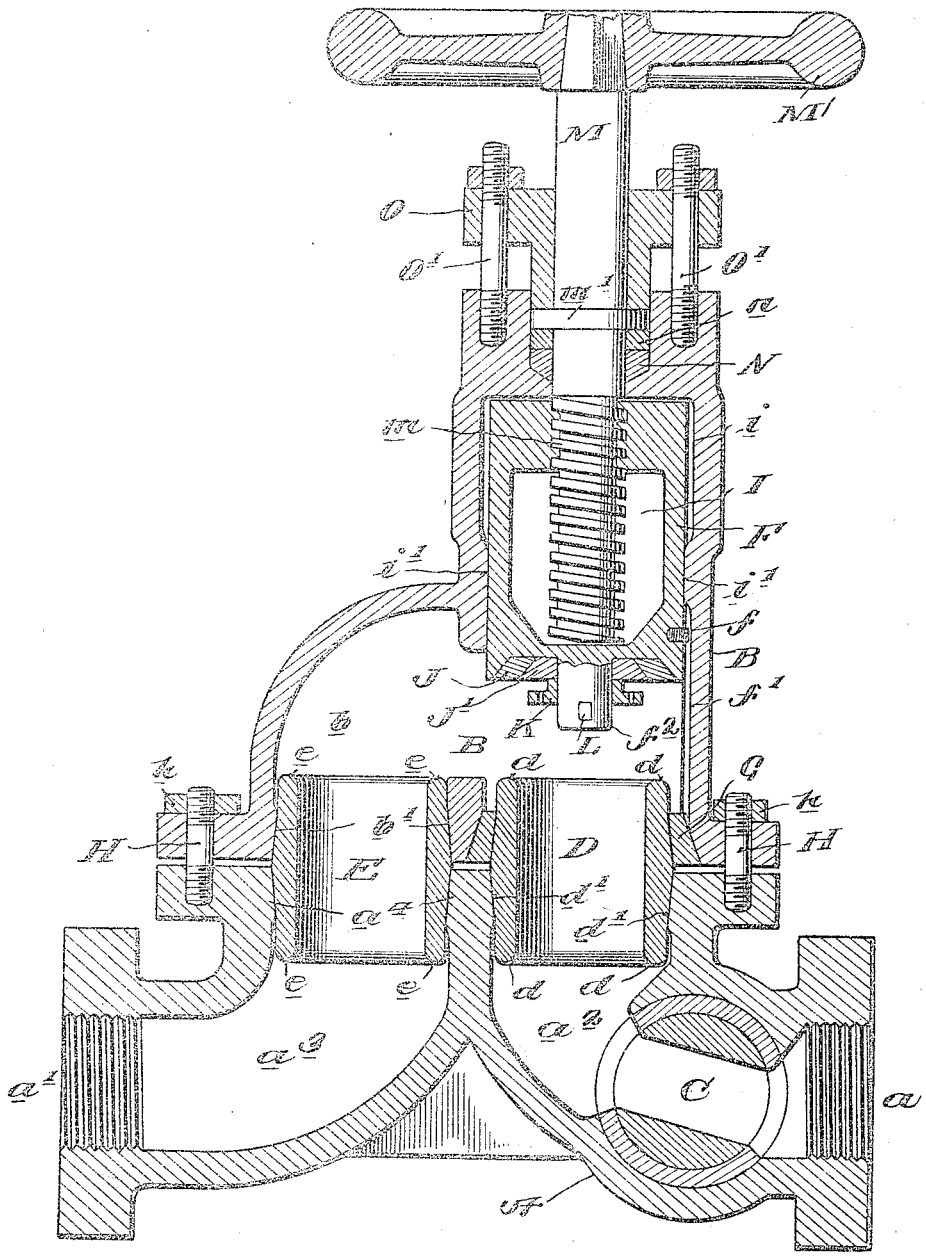

JACOB B. BEAM, OF PUNXSUTAWNEY, PENNSYLVANIA.

VALVE.

1,225,002.  Specification of Letters Patent.  Patented May 8, 1917.

Application filed March 19, 1913, Serial No. 755,370. Renewed October 3, 1916. Serial No. 123,518.

*To all whom it may concern:*

Be it known that I, JACOB B. BEAM, a citizen of the United States, residing in Punxsutawney, in the county of Jefferson and State of Pennsylvania, have invented certain new and useful Improvements in Valves, of which the following is a specification.

My invention relates particularly to blow-off valves for steam boilers and the object of my invention is to provide a valve of this class of improved construction which may be taken apart and put together for purposes of repair while the boiler is under pressure and which is provided with one or more removable valve-seats which are so formed and so mounted that they make a steam tight connection with the two members of the valve-casing and the necessity of using packing between said sections is avoided.

Other features of the invention will be hereinafter described.

The accompanying drawing shows a vertical central section of a blow-off valve for steam boilers embodying my improvements.

The valve casing is formed in two sections A and B. The lower section A has a threaded entrance port $a$ to connect with a supply pipe and a threaded exit port $a'$ to connect with a suitable discharge pipe. The section A is provided with a chamber $a^2$ between which and the entrance port $a$ is interposed a stop valve C. The casing B is provided with a chamber $b$ which communicates with the chambers $a^2$, $a^3$ through the valve-seats D and E. These seats are preferably precisely of the same size and the same shape, their outer surfaces being tapered in opposite directions. Both of them are provided with faces $d$, $e$ adapted to engage the valve F when in line therewith. The seat E however when in the position shown in Fig. 1 of course does not engage the valve. At this time it operates merely as a gasket. The walls of the section A are tapered at $a^4$ to fit closely the tapered walls of the seat E and the walls of the section B are tapered properly at $b'$ to fit closely the tapered walls of the seat E. In like manner the walls of the section A are tapered at $d'$ to fit the tapered walls of the seat D and in the section B I place a tapered ring G which fits closely a tapered portion of section B and also fits closely the tapered walls of the seat D. The sections A and B are flanged as shown and are secured together with threaded pins or bolts H and nuts $h$. No packing is used between the sections but when the bolts and nuts are tightened the two sections are drawn toward each other and clamp the seats D and E between them so closely as to form steam-tight joints.

It will be observed that the tapered portions of the seats are straight tapers in contradistinction to being rounded so that the seats are not liable to rock in their mountings as might be the case if an obstruction, such as scale, should lodge on the edge of one of the seats or on the valve face.

It will furthermore be observed that the ring G is differentially tapered, that is to say, the inner tapered side which fits the outer wall of the valve-seat D is not inclined to so great an extent as the outer wall of the ring. The function of this construction will be hereinafter more fully described.

The section B is provided with a chamber I for the valve F. This chamber may be enlarged at $i$ so as not to touch the valve while the portion $i'$ of the chamber may be made to fit the valve closely. This portion is machined in order to make a smooth connection but the portion $i$ may be roughly cast. The valve is provided with a guide pin $f$ operating in a groove $f'$ of the casing section B. This permits the valve to move back and forth toward the valve-seat, but prevents it from turning. The valve F is formed with a boss $f^2$ over which is fitted a soft metal frustum shaped ring J which is held in place by another frustum shaped ring J' fitting over the boss $f^2$.

K is a shield which serves to prevent scale striking the soft metal casing of the valve. The rings J, J' and the shield K are held in place by the cotter pin L. By removing this pin the shield and two rings may be easily taken off and replaced.

No claim is made herein to the devices for attaching the frustum shaped ring J to the valve, the right being reserved to claim such subject-matter in another application.

The valve spindle M is provided with a hand-wheel M' and is formed with a threaded portion $m$ which engages the valve F and operates it in the usual way. The spindle is formed with an annular flange $m'$ arranged in a recess in the upper part of the casing section B. In this recess around the valve spindle is placed packing material N and between this packing and the flange $m'$ is arranged a washer $n$. A gland O is attached by bolts O' to the section B and bears on the flange $m'$. When the bolts are tightened pressure is communicated through the flange $m'$ and the washer $n$ to the packing N. It will be observed that the gland does not come in direct contact with the packing and that when the spindle is turned there is no wear produced directly on the packing. No claim however is made herein to the subject-matter just described, the right being reserved to claim such subject-matter in another application.

When the parts are assembled in the manner shown in Fig. 1 and the stop valve C is open steam will pass through the valve C and through the valve-seats D and E to the discharge port $a'$. By operating the hand-wheel M' the passage of steam through the valve-seat D may be arrested. When the active face of the valve-seat D becomes worn the casing sections may be separated and the seat D reversed presenting a new face to coöperate with the valve F. When both faces of the seat D are worn out the seat D may be entirely removed and replaced by the seat E and the seat D may then take the place of the seat E and will act as a gasket.

It may be readily understood how this may be done because it is only necessary to loosen the bolts H and separate the sections A and B when the seats D and E may be removed, reversed, interchanged or replaced. When such separation takes place the stop valve C may be employed to shut off the passage of steam to the chamber $a^2$ until after the valve seats are readjusted.

It will be observed that the construction is such that the valve F may be withdrawn through the opening below it in the casing section B when said section is separated from the section A. In order to do this the section B is lifted from the section A and then the valve-seat D with the ring G adhering thereto is withdrawn from the opening in the upper section. This, as is clear from the drawings, leaves an opening sufficiently large to permit the valve to pass out from its casing section. In order that the ring G may readily separate from the casing section B its outer wall is given a decided taper. If said outer wall were straight or only slightly tapered separation would be made more difficult.

While I have shown my improvements applied to a specific form of valve in which the entrance and exit ports are in line with each other, and in which a spare valve-seat is used, I do not wish to limit myself to a valve of this construction as my improved valve-seat and its devices for attaching it to a valve casing are applicable to valves of various kinds.

I claim as my invention:

1. A blow-off valve, comprising a sectional valve casing having communicating openings with tapered walls, a reversible valve-seat having tapered outer walls engaging the tapered wall of the lower casing section, a ring surrounding and closely fitting the upper portion of the valve-seat detachable therefrom and having tapered outer walls engaging the tapered walls of the opening in the upper casing section.

2. A blow-off valve, comprising a casing having two sections communicating with each other, the lower section having an opening formed with tapered walls to receive a valve-seat and the upper section having an opening of larger diameter and having tapered walls, a valve removable through said last mentioned opening, a reversible valve-seat having tapered walls engaging the tapered walls of the opening in the lower casing section, and a ring surrounding the upper portion of the valve-seat closely fitting it detachable therefrom and having tapered outer walls engaging the tapered walls of the opening in the upper section of the casing.

In testimony whereof, I have hereunto subscribed my name.

JACOB B. BEAM.

Witnesses:
BEULAH NEILSON,
H. C. WINSLOW.

Copies of this patent may be obtained for five cents each, by addressing the "Commissioner of Patents, Washington, D. C."